US012649480B2

(12) United States Patent
Bell

(10) Patent No.: US 12,649,480 B2
(45) Date of Patent: Jun. 9, 2026

(54) COURTEOUS MODE FOR ADJUSTING VEHICLE FUNCTIONS

(71) Applicant: Honda Motor Co., Ltd., Tokyo (JP)

(72) Inventor: Brian David Bell, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 43 days.

(21) Appl. No.: 18/922,935

(22) Filed: Oct. 22, 2024

(65) Prior Publication Data

US 2026/0109366 A1    Apr. 23, 2026

(51) Int. Cl.
| | |
|---|---|
| *B60W 50/08* | (2020.01) |
| *B60K 35/10* | (2024.01) |
| *B60W 30/182* | (2020.01) |
| *B60W 50/00* | (2006.01) |

(52) U.S. Cl.
CPC ........... *B60W 50/082* (2013.01); *B60K 35/10* (2024.01); *B60W 30/182* (2013.01); *B60K 2360/119* (2024.01); *B60K 2360/139* (2024.01); *B60W 2050/0083* (2013.01); *B60W 2540/215* (2020.02)

(58) Field of Classification Search
CPC .............. B60K 35/10; B60K 2360/119; B60K 2360/139; B60W 30/182; B60W 50/08; B60W 50/082; B60W 2050/0083; B60W 2540/215
USPC .......................................................... 701/36
See application file for complete search history.

(56) References Cited

U.S. PATENT DOCUMENTS

| | | | | |
|---|---|---|---|---|
| 9,916,746 | B2 * | 3/2018 | Johnson | .................. H04N 7/186 |
| 10,443,266 | B2 * | 10/2019 | Johnson | ............. G07C 9/00944 |
| 10,471,968 | B2 | 11/2019 | Krishnan | |
| 10,993,111 | B2 * | 4/2021 | Johnson | .................. H04W 4/33 |
| 11,027,648 | B2 | 6/2021 | Harper et al. | |
| 11,072,945 | B2 * | 7/2021 | Johnson | .................. G08B 13/08 |
| 11,527,121 | B2 * | 12/2022 | Johnson | ............. G07C 9/00571 |
| 11,571,969 | B2 | 2/2023 | Domeyer et al. | |
| 2010/0157614 | A1 * | 6/2010 | Hue | ...................... B60Q 1/1423 |
| | | | | 362/465 |
| 2014/0015411 | A1 * | 1/2014 | Ehlgen | ................... B60Q 1/143 |
| | | | | 315/82 |

(Continued)

FOREIGN PATENT DOCUMENTS

| | | |
|---|---|---|
| AU | 2020256458 A1 | 5/2022 |
| BR | 102016029401 A2 | 6/2018 |

(Continued)

*Primary Examiner* — Atul Trivedi
(74) *Attorney, Agent, or Firm* — Aaron Fong; American Honda Motor Co., Inc.

(57) ABSTRACT

The present disclosure relates to a courteous mode for adjusting vehicle functions. More particularly, this disclosure describes a button within an instrument cluster of a vehicle to remove flashing of a headlight or signaling of an audible alert such that the owner of the vehicle may be considerate of others. When the button has been actuated, and a door on the vehicle has been opened or closed, the mode prevents the flashing or signaling. The button may be a hardware interface that uses a switch. Numerous other modifications or configurations to the mode are described herein. For example, the button may be implemented in software atop a traditional head unit. The mode may be visually displayed as such. Advantageously, and by having the mode, courteousness may be extended in certain situations or environments.

20 Claims, 11 Drawing Sheets

(56)                References Cited

U.S. PATENT DOCUMENTS

| | | | | |
|---|---|---|---|---|
| 2017/0011570 A1* | 1/2017 | Johnson | ............. | G07C 9/00571 |
| 2017/0016249 A1* | 1/2017 | Johnson | .......... | G08B 13/19656 |
| 2017/0193724 A1* | 7/2017 | Johnson | ............. | G07C 9/00309 |
| 2017/0228603 A1* | 8/2017 | Johnson | ............... | H04N 23/698 |
| 2019/0061687 A1* | 2/2019 | Khalil | .................. | B60R 25/241 |
| 2019/0180124 A1* | 6/2019 | Schindler | ............... | B60K 35/10 |
| 2019/0279447 A1* | 9/2019 | Ricci | ...................... | G06Q 10/00 |
| 2020/0079322 A1* | 3/2020 | Crocker | ............. | G07C 9/00571 |
| 2020/0130573 A1* | 4/2020 | Ito | ........................ | G05D 1/0061 |
| 2021/0034882 A1* | 2/2021 | Johnson | ............. | G07C 9/00309 |
| 2021/0291786 A1* | 9/2021 | Cisneros | ................ | B60R 25/01 |
| 2022/0230456 A1* | 7/2022 | Kasarla | ................... | G06F 3/013 |
| 2022/0266796 A1* | 8/2022 | Peterson | ................ | B60Q 1/323 |
| 2022/0410705 A1* | 12/2022 | Seger, Jr. | ............. | G06F 3/0446 |
| 2023/0127977 A1* | 4/2023 | Haskin | ................... | H04L 67/12 |
| | | | | 340/5.72 |
| 2023/0271589 A1* | 8/2023 | Pham | ................. | B60H 1/00657 |
| | | | | 701/2 |
| 2024/0132079 A1* | 4/2024 | Medina | .................. | B60K 35/85 |
| 2024/0191476 A1* | 6/2024 | Roehlk | ....................... | B60J 5/02 |
| 2024/0253419 A1* | 8/2024 | Sanders | ............. | B60H 1/00657 |
| 2024/0326837 A1* | 10/2024 | Teman | .................. | B60W 50/16 |
| 2025/0232663 A1* | 7/2025 | Petersen | .............. | G08B 25/008 |
| 2025/0301323 A1* | 9/2025 | Johnson | ................. | G06V 20/52 |

FOREIGN PATENT DOCUMENTS

| | | | | | |
|---|---|---|---|---|---|
| DE | 749871 C | 12/1944 | | | |
| DE | 1913975 U | 4/1965 | | | |
| FR | 3103612 A1 | 5/2021 | | | |
| IT | FI960239 A1 | 4/1998 | | | |
| IT | VA20010021 A1 | 1/2003 | | | |
| KR | 20180126119 A | * | 11/2018 | ....... | B60R 21/01554 |
| RU | 2017127460 A | * | 2/2019 | ............. | B60Q 1/143 |

* cited by examiner

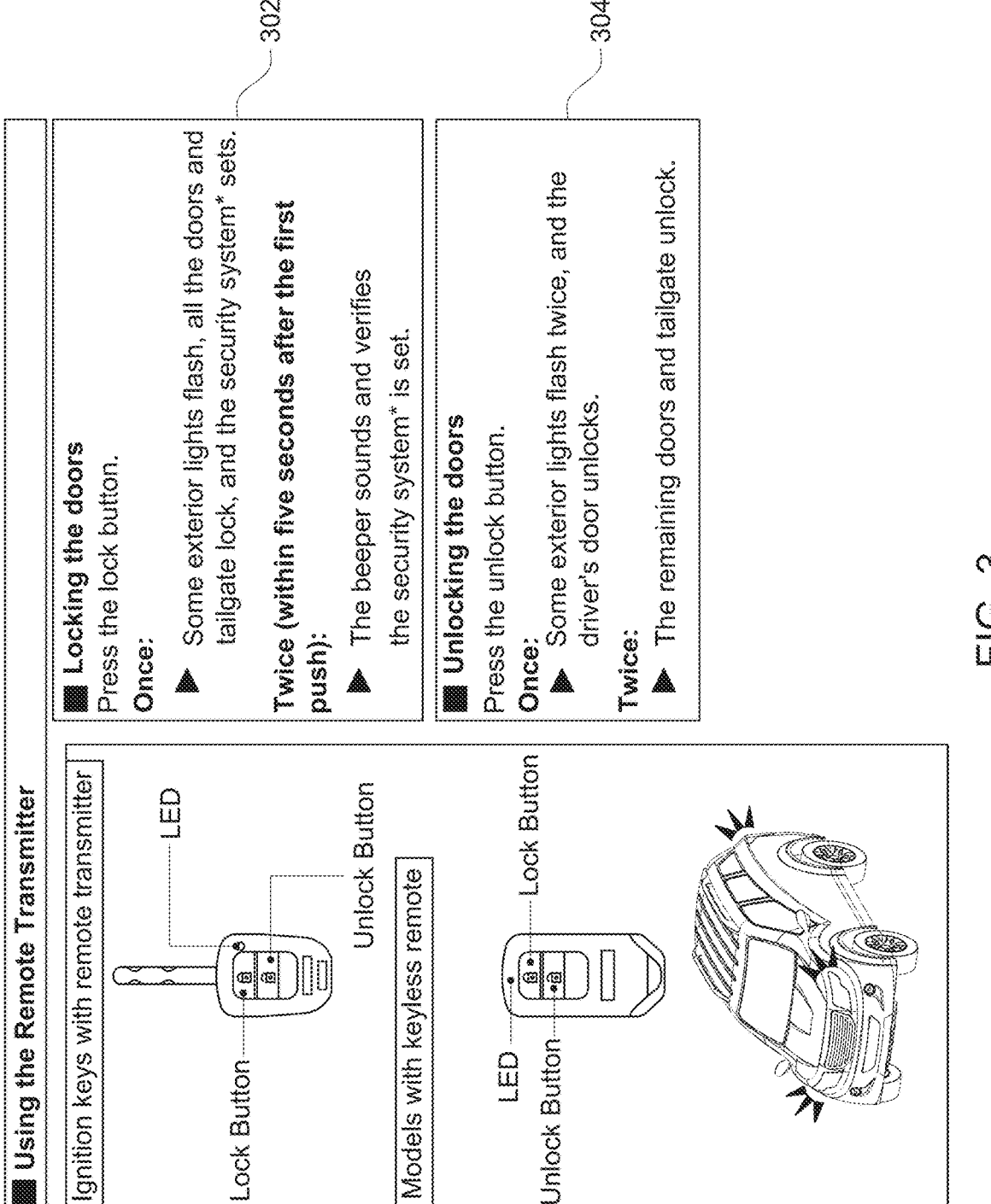

■ Using the Remote Transmitter

Ignition keys with remote transmitter

LED

Lock Button

Unlock Button

Models with keyless remote

Lock Button

LED

Unlock Button

■ Locking the doors
Press the lock button.

Once:

▲ Some exterior lights flash, all the doors and tailgate lock, and the security system* sets.

Twice (within five seconds after the first push):

▲ The beeper sounds and verifies the security system* is set.

302

■ Unlocking the doors
Press the unlock button.

Once:

▲ Some exterior lights flash twice, and the driver's door unlocks.

Twice:

▲ The remaining doors and tailgate unlock.

Locking/Unlocking the Doors from the Outside

■ Using the Keyless Access System*

When you carry the keyless remote, you can lock/unlock the doors and open the tailgate. You can lock/unlock the doors within a radius of about 32 inches (80 cm) of the outside door handle. You can open the tailgate within about 32 inches (80 cm) radius from the tailgate outer handle.

■ Locking the doors and tailgate

Touch the door lock sensor on a front door or press the lock button on the tailgate.

▲ Some exterior lights flash; the beeper sounds; all the doors and tailgate lock; and the security system sets.

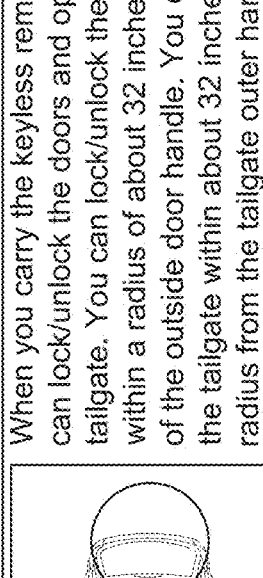

Door Lock Sensor

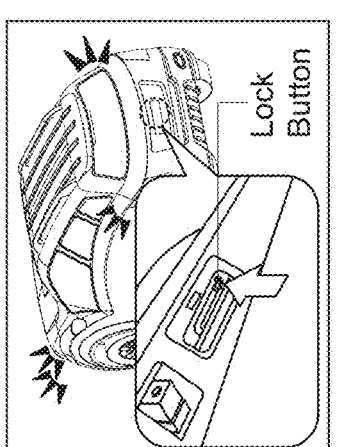

Lock Button

⊠ Locking/Unlocking the Doors from the Outside

If the interior light switch is in the door activated position, the interior light comes on when you unlock the doors and tailgate.

No doors opened: The light fades out after 30 seconds.

Doors and tailgate relocked: The light goes off immediately.

 Interior Lights P. 213

⊠ Using the Keyless Access System*

If you do not open a door or the tailgate within 30 seconds of unlocking the vehicle with the keyless access system, the doors and tailgate will automatically relock.

You can lock or unlock doors using the keyless access system only when the power mode is in VEHICLE OFF.

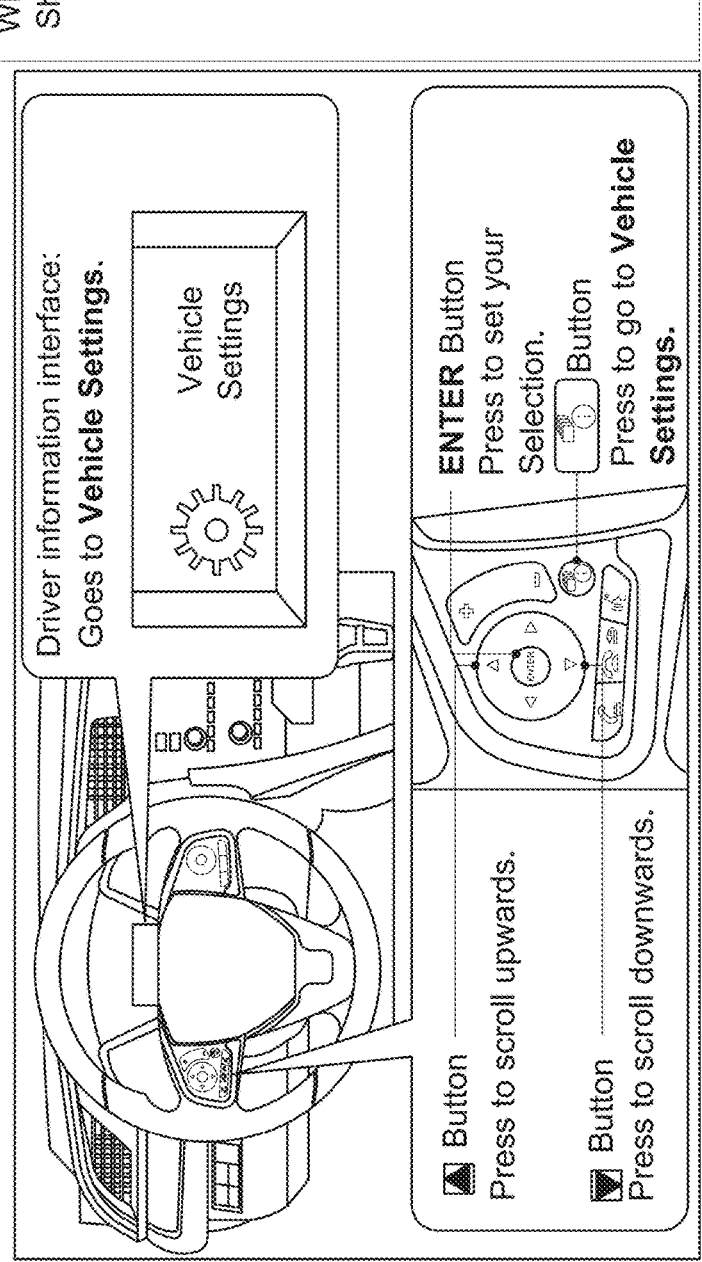

Models with color audio system

■ Customized Features

Use the driver information interface to customize certain features.

■ How to customize

Select the Vehicle Settings screen by pressing the 🔘 button while the ignition switch is in ON ⓘ, and the vehicle is at a complete stop, and the shift lever is in P .

Select Vehicle Settings, then press the ENTER button.

Driver information interface:
Goes to Vehicle Settings.

Vehicle Settings

◄ Button
Press to scroll upwards.

▼ Button
Press to scroll downwards.

ENTER Button
Press to set your
Selection.

🔘 Button
Press to go to Vehicle Settings.

⊠ Customized Features

To customize other features,
press the ◄ / ▼
button.

☑ **List of customizable
options** P. 130

☑ **Example of customization
settings** P. 134

When you customize settings:
Shift to P .

COURTEOUS MODE FOR ADJUSTING VEHICLE FUNCTIONS

BACKGROUND

Vehicle functions have evolved significantly over time, incorporating increasingly complex systems. These advancements have led to a growing need for intuitive and customizable interfaces that allow drivers to easily adjust various vehicle settings. Recent developments in vehicle electronics and human-machine interfaces (HMIs) have opened up new possibilities for more sophisticated and user-friendly control systems. Touchscreens, voice commands, and gesture recognition have become increasingly common in vehicles, offering more intuitive and flexible ways to interact with vehicle functions.

However, even with these advancements, there remains a challenge in designing interfaces that are both effective and adaptable to the diverse needs and preferences of different drivers. For example, when a user wishes to adjust vehicle lighting and horn activations, multiple nested screens may be required. These may need to be changed quite frequently when different situations arise.

The present disclosure provides for a courteous mode for adjusting vehicle functions that is intuitive and easy to use. Other benefits and advantages will become clear from the disclosure provided herein and those advantages provided are for illustration. The statements in this section merely provide the background related to the present disclosure and does not constitute prior art.

BRIEF DESCRIPTION

This summary is provided to introduce a selection of concepts in a simplified form that are further described below in the DESCRIPTION OF THE DISLCOSURE. This summary is not intended to identify key features of the claimed subject matter, nor is it intended to be used as an aid in determining the scope of the claimed subject matter.

In accordance with one aspect of the present disclosure, a system for controlling at least one function within a vehicle is provided. The system may include an option to remove the at least one vehicle function. In addition, the system may include a sensor determining whether a door on the vehicle has been opened or closed. A controller is provided with the system for removing the at least one vehicle function when the option has been selected and the vehicle door has been opened or closed.

In accordance with another aspect of the present disclosure, a vehicle is provided. The vehicle may include a headlight, a speaker providing an audible alert, a sensor determining whether a door on the vehicle has been opened or closed, and a button within an instrument cluster of the vehicle when selected and the door has been opened or closed removes activation of the headlight or the audible alert.

In accordance with yet another aspect of the present disclosure, a method for providing a courtesy mode for a vehicle is provided. The method may include detecting selection of a button within an instrument cluster of the vehicle, detecting when a door of the vehicle has been opened or closed, and removing activation of a headlight or audible alert when the button has been selected and the door of the vehicle has been opened or closed.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES may be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

FIG. 3 is an exemplary manual indicating instructions for using a remote transmitter in accordance with one aspect of the present disclosure;

FIG. 4 is the exemplary manual indicating instructions for locking/unlocking doors from an outside of the vehicle in accordance with one aspect of the present disclosure;

FIG. 5 is the exemplary manual indicating instructions for customizing features in accordance with one aspect of the present disclosure;

DESCRIPTION OF THE DISCLOSURE

The description set forth below in connection with the appended drawings is intended as a description of exemplary embodiments of the disclosure and is not intended to represent the only forms in which the present disclosure may be constructed and/or utilized. The description sets forth the functions and the sequence of blocks for constructing and operating the disclosure in connection with the illustrated embodiments. It is to be understood, however, that the same or equivalent functions and sequences may be accomplished by different embodiments that are also intended to be encompassed within the spirit and scope of this disclosure.

The present disclosure relates to a courteous mode for adjusting vehicle functions. More particularly, this disclosure describes a button within an instrument cluster of a vehicle to remove flashing of a headlight or signaling of an audible alert such that the owner of the vehicle may be considerate of others. When the button has been actuated, and a door on the vehicle has been opened or closed, the mode prevents the flashing or signaling. The button may be a hardware interface that uses a switch. Numerous other modifications or configurations to the mode will become apparent from the description provided below. For example, the button may be implemented in software atop a traditional head unit. The mode may be visually displayed as such. Advantageously, and by having the mode, courteousness may be easily extended in certain situations or environments. Other advantages will become apparent from the description provided below.

Figure 1:
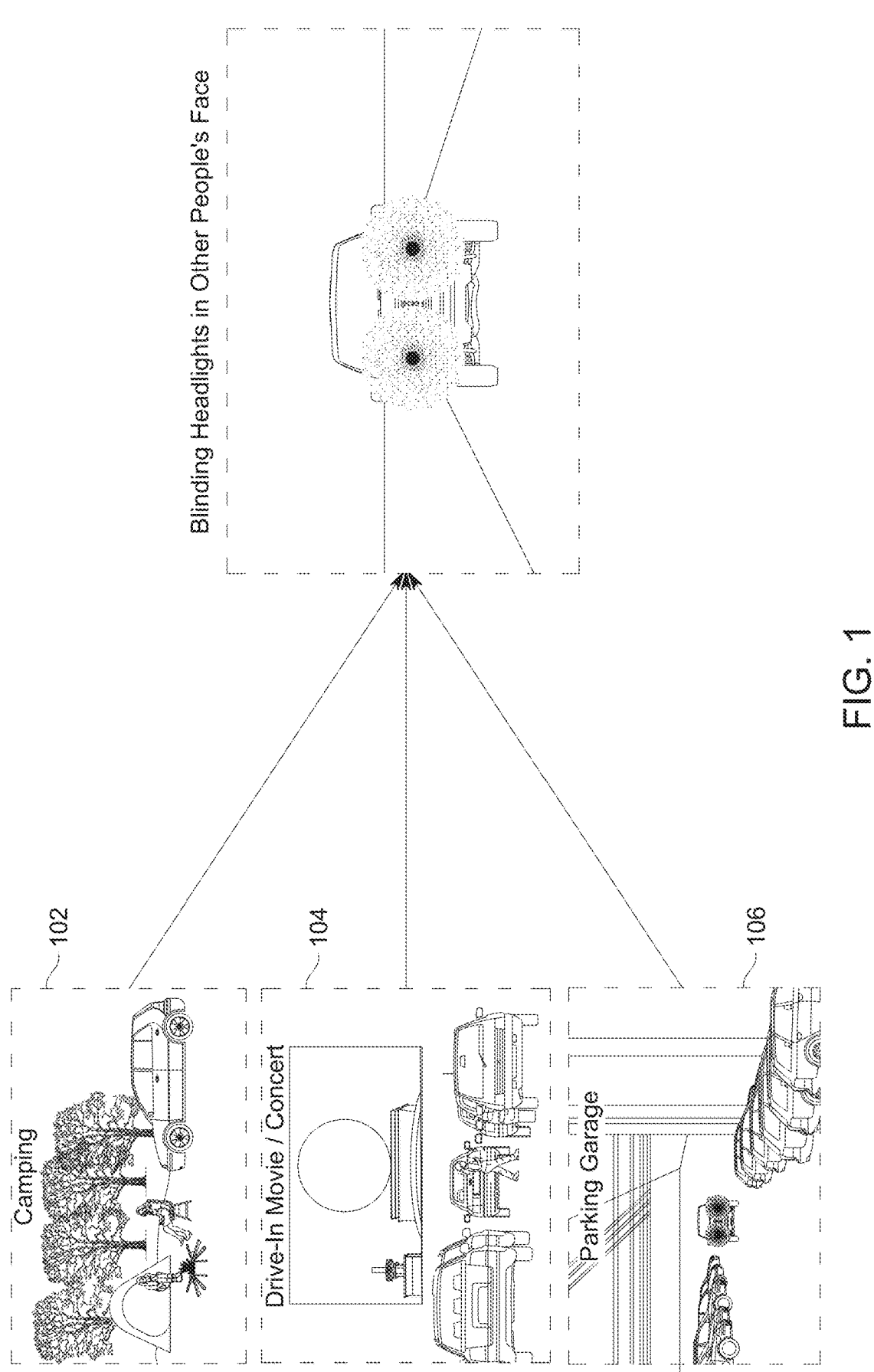
FIG. 1 is a schematic diagram indicating illustrative concerns with respect to actuating headlights of a vehicle in accordance with one aspect of the present disclosure.

FIG. 1 presents a schematic diagram illustrating potential issues with actuating vehicle headlights, as envisioned in one aspect of the present disclosure. In various scenarios, a vehicle user may desire to be considerate or respectful of others, aiming to avoid disturbing them. For instance, the user might refrain from flashing headlights, as this may be distracting or blinding to others. In a typical situation, the headlights might remain illuminated for a period after the door is opened and may also activate or remain on when the door is closed.

In one example, a driver's headlights may disturb a campground 102, especially at night, potentially startling or waking up campers. Additionally, flashing headlights at a drive-in movie/concert 104 may disrupt the event and detract from the experience for other attendees. Furthermore, a driver may prefer to avoid flashing their headlights in a parking garage 106, as this may blind or distract others in tight spaces, potentially leading to accidents with pedestrians or other vehicles.

Figure 2:
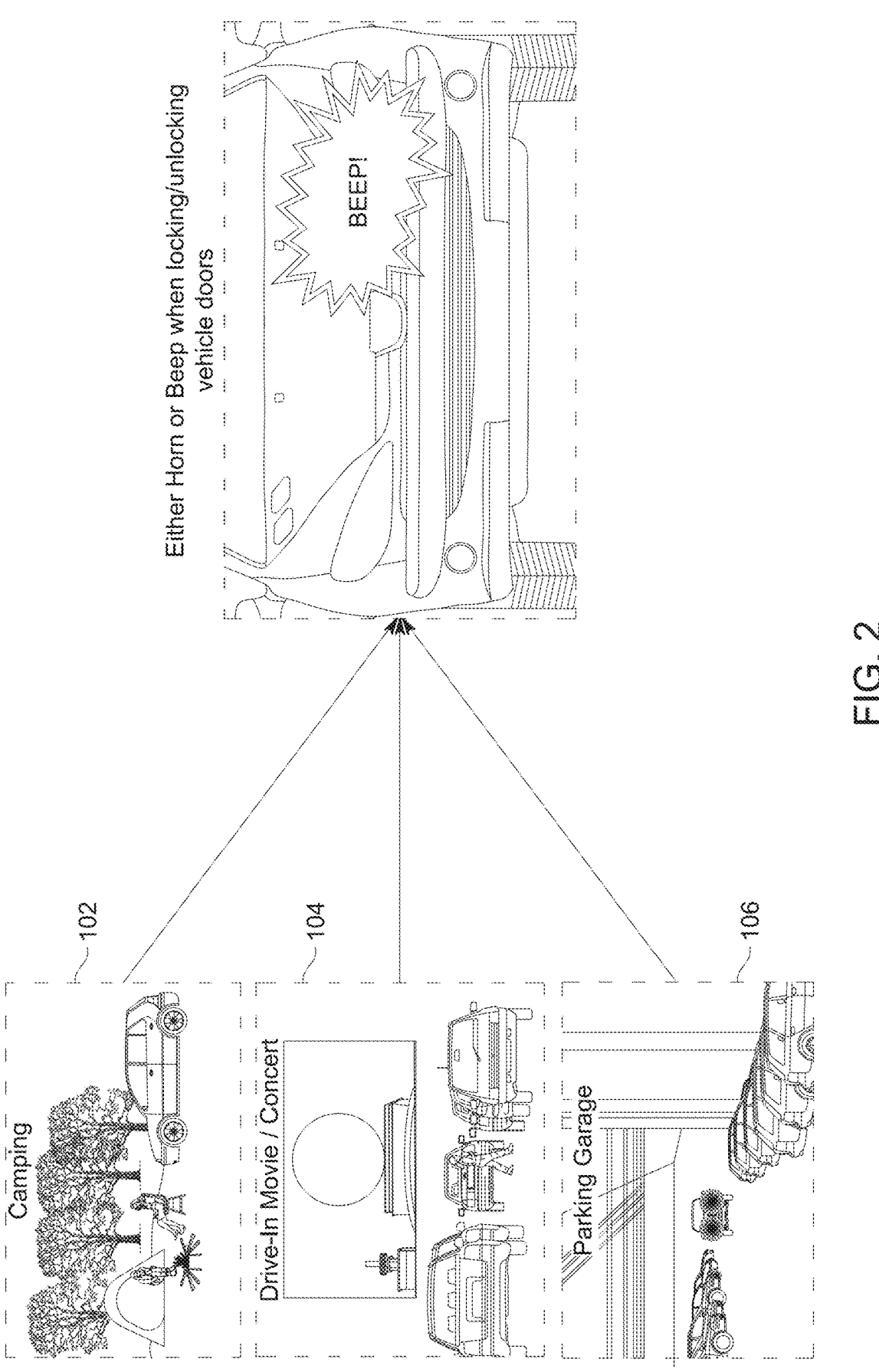
FIG. 2 is a schematic diagram indicating illustrative concerns with respect to actuating a horn/beeper/chime of the vehicle in accordance with one aspect of the present disclosure.

In many of the scenarios described, the user may prefer to keep their headlights off to reduce glare and light pollution. Additionally, as illustrated in FIG. 2, the user may also want to avoid honking, beeping, or using the vehicle's chime, as these audible cues may be distracting in certain environments. For instance, a driver's horn may disturb a resting area like a campground 102, potentially waking up others, especially at night. Additionally, honking at a drive-in movie/concert 104 may disrupt the event. In a parking garage 106, the horn's sound may be amplified and distracting, potentially startling others in tight spaces. The mode described herein may prevent or disable these actions, reduce noise pollution and avoid disturbances.

FIG. 3 is an illustrative manual providing instructions for using a remote transmitter, as outlined in one aspect of the present disclosure. The remote transmitter offers various options, including "Locking the doors" at block 302 and "Unlocking the doors" at block 304. These features may be accessed using a key fob or remote transmitter, as illustrated.

As shown in block 302, pressing the lock button on the key fob allows the user to lock the vehicle doors. When the user exits the vehicle and locks the doors, the exterior lights flash, all doors and the tailgate lock, and the security system is activated. Pressing the lock button twice sounds a beeper on the key fob to confirm the security setting. The horn and lights may be undesirable in certain situations, such as those previously mentioned, including at campgrounds, drive-in theaters, and parking garages.

As shown in block 304, pressing the unlock button on the key fob allows the user to unlock the vehicle doors. When the user exits the vehicle and unlocks the doors, the exterior lights flash twice and the driver's door unlocks. Pressing the unlock button twice unlocks the remaining doors and the tailgate. Again, the horn and lights may be undesirable in certain situations, such as those previously mentioned, including campgrounds, drive-in theaters, and parking garages.

In both functions for "Locking the doors" at block 302 and "Unlocking the doors" at block 304, the headlights may flash, and the horn, chime, or beeper may sound. This may be distracting to those nearby. Excessive honking or headlight flashing may be disruptive and annoying to others, especially in residential areas or at night. Additionally, these actions may distract drivers and pedestrians, potentially leading to accidents. Furthermore, the meaning of honking or headlight flashing may be misinterpreted, leading to misunderstandings or confrontations.

Excessive honking or headlight flashing may be considered a traffic violation in some jurisdictions, leading to fines or points on a driver's license. In extreme cases, persistent honking or headlight flashing may constitute harassment, with potential consequences. Additionally, excessive headlight use may contribute to increased energy consumption and emissions.

FIG. 4 illustrates a manual providing instructions for locking and unlocking vehicle doors from outside the vehicle, as described in one aspect of the present disclosure. This information explains how the vehicle's functions operate when opening and closing the doors without using a key fob. When carrying the keyless remote, the vehicle may lock, unlock, and open the tailgate using these actions. These actions may be performed within approximately 32 inches (80 cm) of the corresponding door or tailgate handle. As shown in block 402, the user may lock the doors by touching the door lock sensor on a front door or pressing the lock button on the tailgate.

Figure 6:
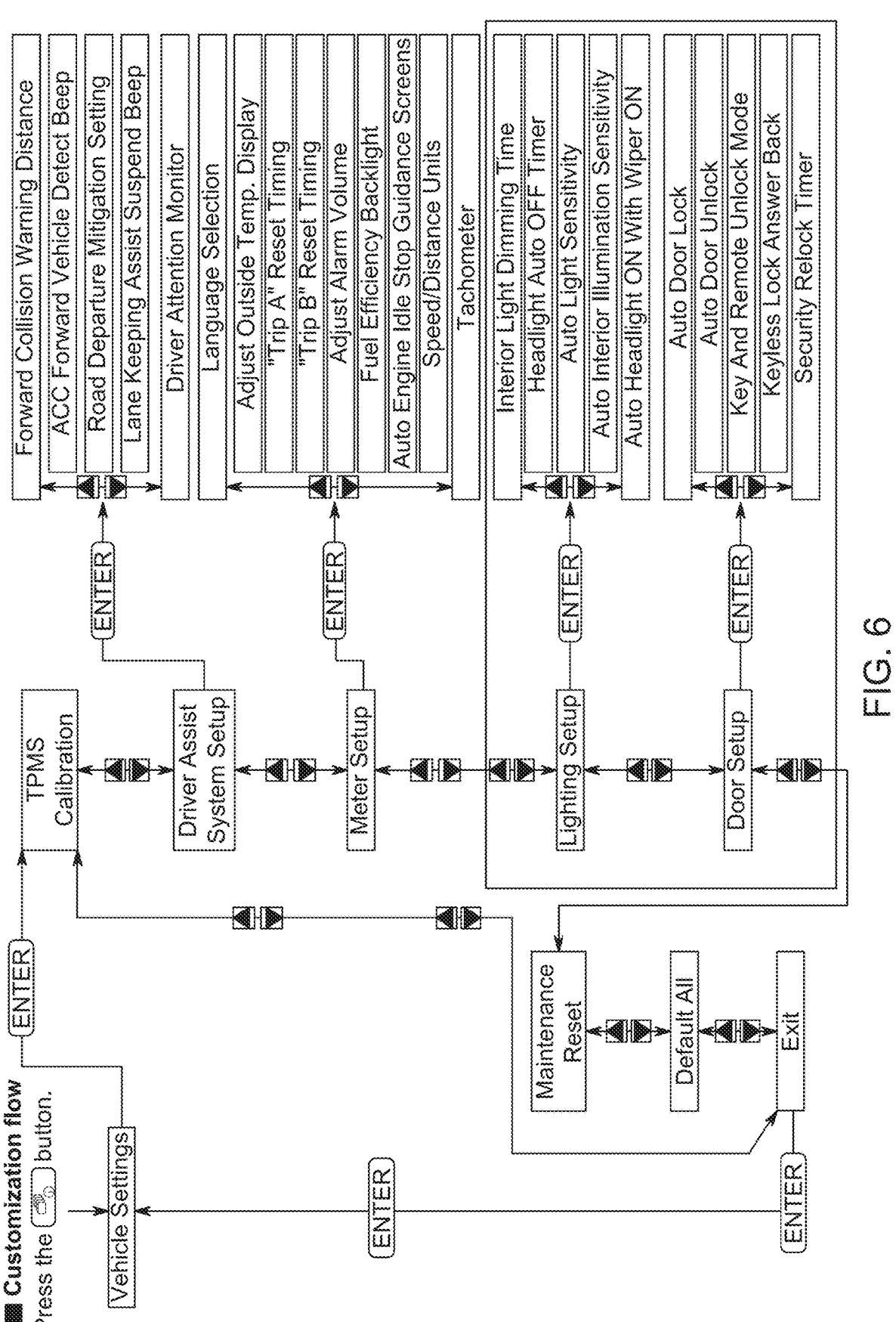
FIG. 6 is the exemplary manual indicating nesting levels for customizing features in accordance with one aspect of the present disclosure.

FIG. 5 illustrates an excerpt from a manual providing instructions for customizing vehicle features, as described in one aspect of the present disclosure. While customization is possible, it may be a lengthy and complex process compared to the simplified button described herein. To customize features, the user must navigate through the "Vehicle Settings" screen, as shown. They may do this by pressing a button, then scrolling through various options. FIG. 6 shows the nested levels involved in customizing features, including turning off headlights and audible alerts like horns, chimes, and beeps. This process requires navigating through multiple menus, such as Vehicle Settings, TPMS calibration, Lighting Setup, and Door Setup, to adjust individual settings.

While the user may still achieve the desired result of turning off headlights or horns using the existing customization process, it is cumbersome and time-consuming. Requiring the user to repeatedly access and modify settings for each scenario is overly complicated, especially when the goal is to be considerate of others and avoid disturbances in specific situations.

This proposed system described herein aims to control headlights and the horn during vehicle locking and unlocking. When the courtesy mode is activated: upon opening or unlocking the doors, the headlights may remain off to prevent blinding others (parking lights will remain on or flash) until the vehicle is started. This feature is currently available if the electronic parking brake is engaged, but it could be expanded to apply even if the parking brake is not engaged. By keeping the lights off when briefly entering the vehicle, it avoids disturbing others. When closing or locking the doors, the headlights will turn off after the door is closed to prevent blinding others (parking lights will remain on for a predetermined time). The beeper/horn will remain silent when the doors lock to avoid disturbing others. While this may currently be achieved by individually adjusting system settings, the process is time-consuming and inconvenient for one-time situations.

Figure 7:
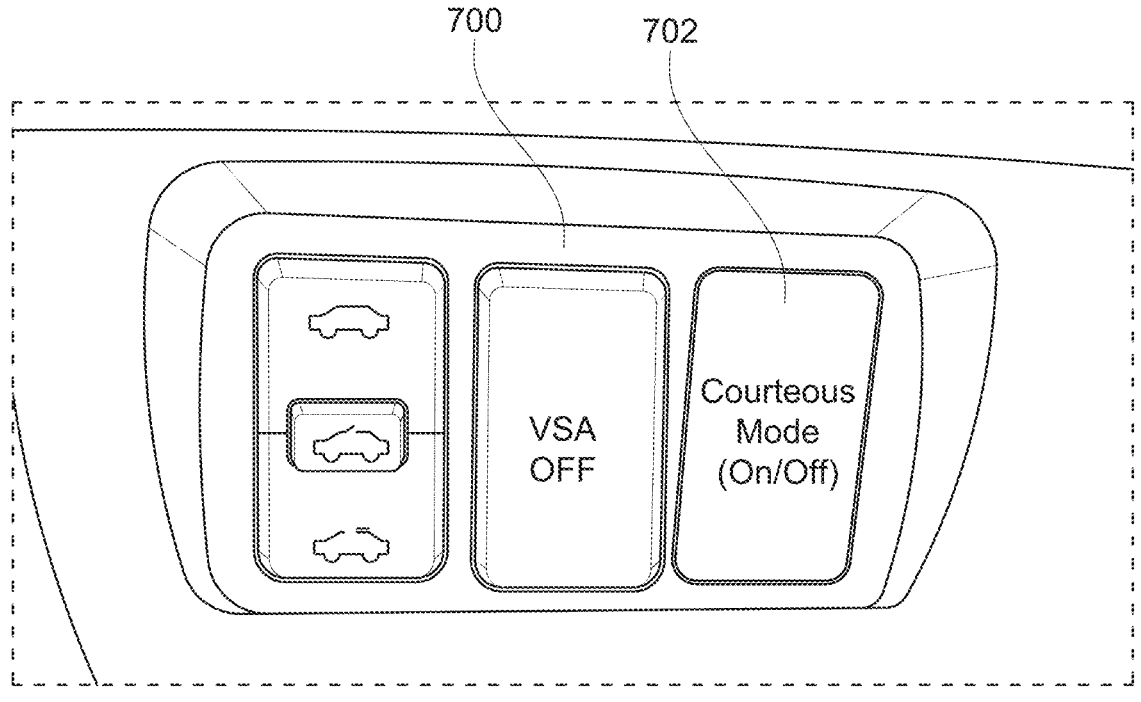
FIG. 7 is an exemplary hardware interface for providing a courteous mode in accordance with one aspect of the present disclosure.

FIG. 7 illustrates an example hardware interface 700 for activating the courtesy mode, as described in one aspect of the present disclosure. This interface 700 provides a convenient alternative to the existing customization options. When combined with opening or closing the doors, the courtesy mode may be activated using the hardwired button 702. This button 702 activates a switch that turns the courtesy mode on or off. As previously explained, the courtesy mode may adjust headlights and audible cues to suit different situations. An indicator light on the button 702 may show whether the courtesy mode is currently active.

Figure 8:
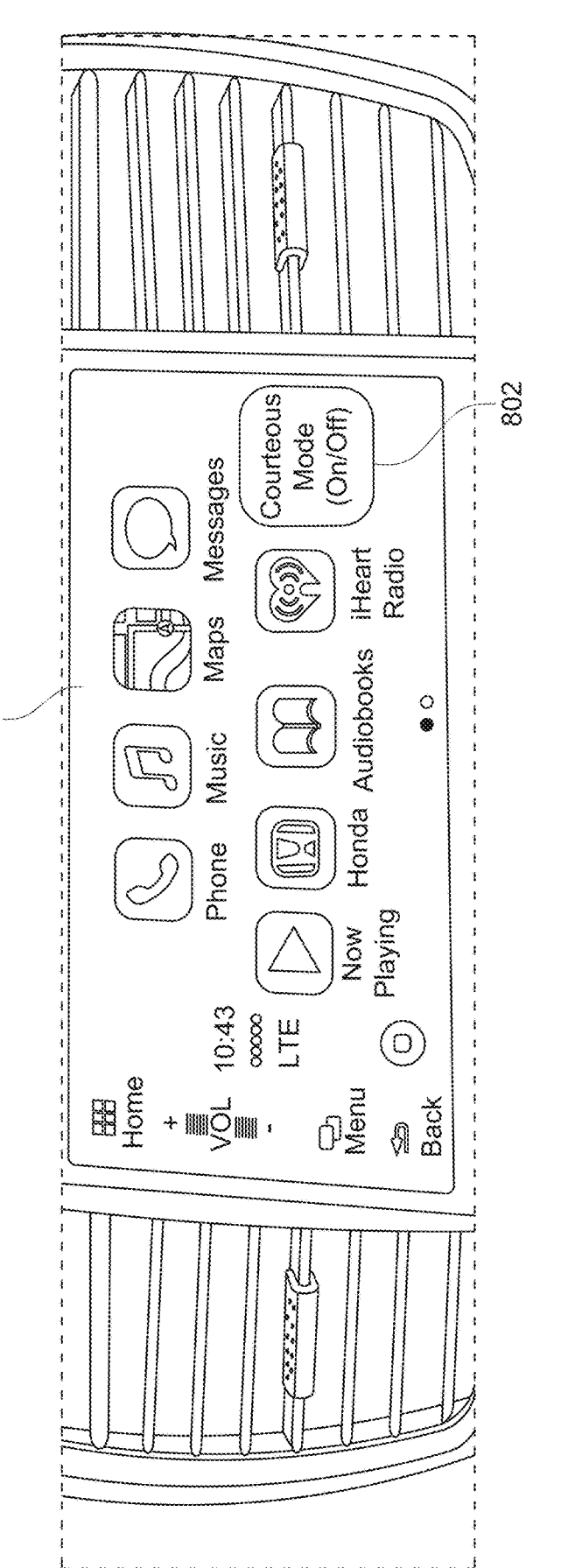
FIG. 8 is an exemplary software interface for providing a courteous mode in accordance with one aspect of the present disclosure.

FIG. 8 illustrates an example software interface 800 for activating the courtesy mode, as described in one aspect of the present disclosure. This software interface may be used as an alternative or in conjunction with the hardware interface 700. An icon 802 may be used instead of the physical button. The icon 802 may be placed on a screen of various user interfaces displayed on the vehicle's head unit. Pressing this icon 802 allows the user to enable or disable the selected function. The icon 802 may be displayed on all screens of the user interface.

Other interfaces may be used to activate the courtesy mode. For instance, when the user is exiting the vehicle, before closing the door, the vehicle may prompt them to select the courtesy mode. Location information may be used to determine if this prompt is appropriate. If the vehicle detects that it is in one of the previously mentioned situations, it may ask the user if they want to activate the courtesy mode. Additionally, the courtesy mode may be activated automatically based on the user's calendar, location, time, day, or other factors. This approach eliminates the need for the user to manually activate the mode using a software or hardware button.

Upon entering the vehicle, the courtesy mode may be activated based on factors such as the user's calendar, location, time, and day. For instance, if a movie is playing and it is not over, and the user enters the vehicle, the courtesy mode may be activated automatically. The vehicle may utilize location information and movie scheduling data to make this determination.

Figure 9:
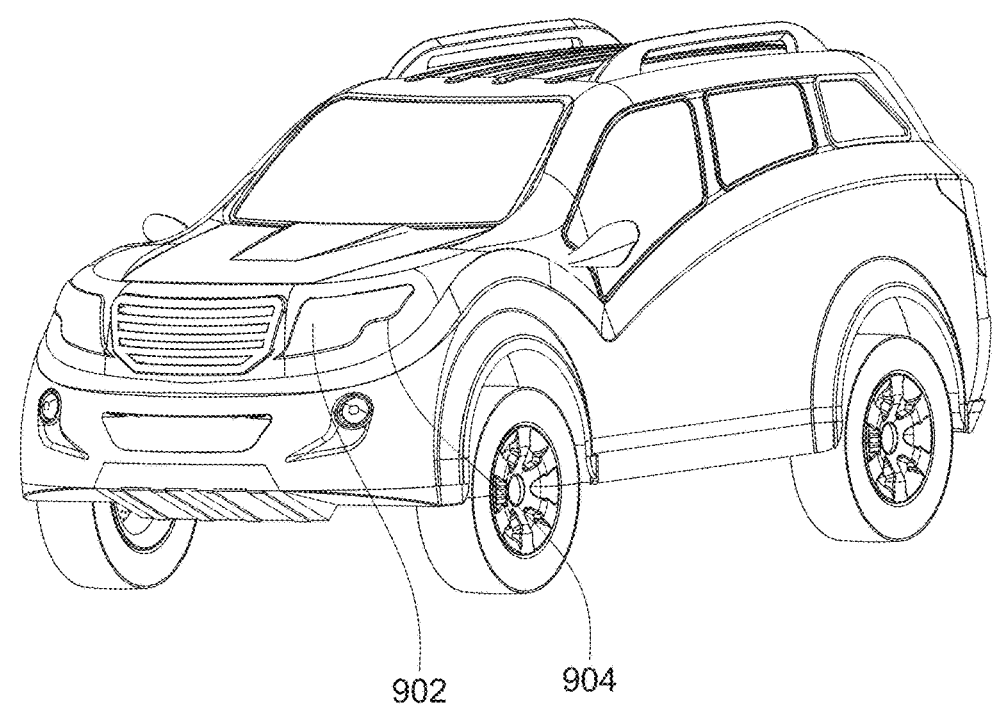
FIG. 9 is an illustrative exterior of the vehicle showing vehicle front headlights and parking brake lights in accordance with one aspect of the present disclosure.

FIG. 9 illustrates an exterior view of the vehicle, showcasing the front headlights and parking lights, as described in one aspect of the present disclosure. When the courtesy mode is activated, various lights and features may be adjusted. As shown in these examples, the front headlights 902 may be deactivated while the front parking lights 904 remain on. This helps prevent blinding others when the vehicle door is opened or closed. The parking lights 904 offer a lower light level, minimizing disturbances to others. They also serve as a guide for the user, helping them locate the vehicle in areas with low ambient light.

Figure 10:
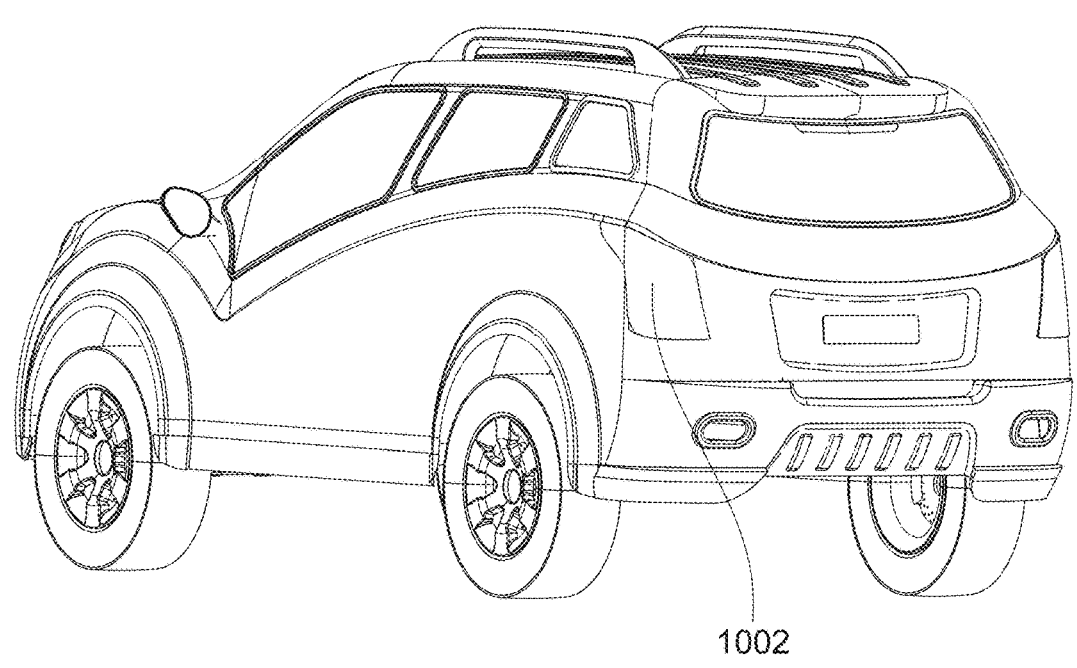
FIG. 10 is an illustrative exterior of the vehicle showing vehicle back parking brake lights in accordance with one aspect of the present disclosure.

FIG. 10 illustrates an exterior view of the vehicle, showcasing the rear parking lights 1002, as described in one aspect of the present disclosure. In addition to the front parking lights, these lights 1002 may help identify the vehicle. During the activation of the courtesy mode, both sets of parking lights may remain on for a specified period, as discussed in more detail below.

Figure 11:
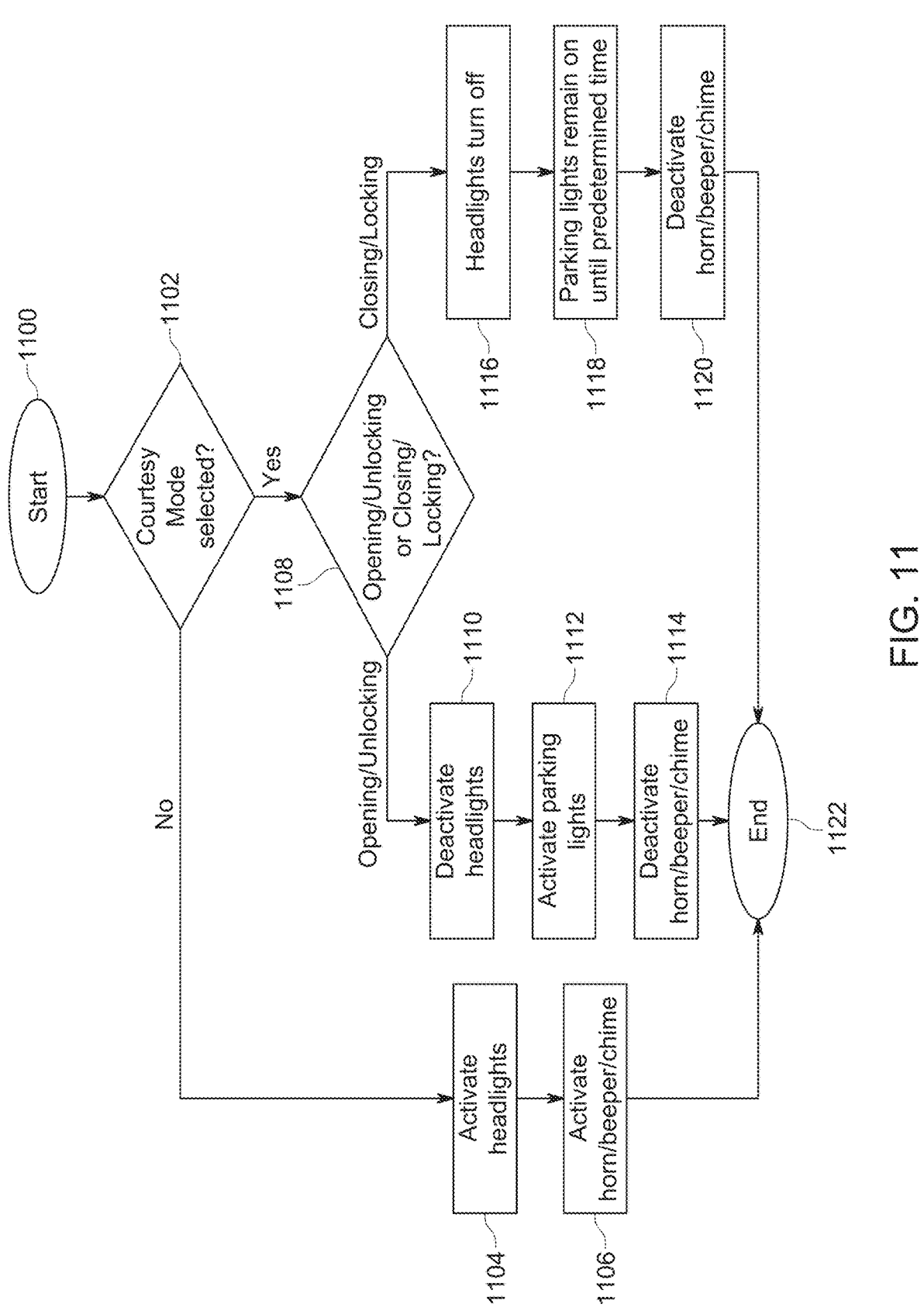
FIG. 11 is an illustrative flow chart showing processes for providing the courteous mode in accordance with one aspect of the present disclosure.

FIG. 11 presents an illustrative flowchart outlining the processes involved in activating the courtesy mode, as described in one aspect of the present disclosure. These processes are examples and not limitations. The number of processes may vary. The process of enabling or activating the courtesy mode may begin at block 1100.

At decision block 1102, the system determines if the courtesy mode is activated. This may be done by the user pressing the hardware button or software icon, or through other methods described earlier, including automatic activation. If the courtesy mode is not selected, the process continues as before, with the headlights being activated at block 1104 and the horn, beeper, or chime being activated at block 1106. For example, when the courtesy mode is disabled and the user opens the door with their key fob, the headlights will turn on, and the horn, beeper, or chime will sound. The process then concludes at block 1122.

If the courtesy mode is selected at decision block 1102, the process proceeds to decision block 1108, where the vehicle/system determines if the user is opening/unlocking or closing/locking the vehicle. This may be done using a key fob or the external vehicle methods described earlier. For example, the user might press the unlock or lock button on the key fob. When the user is opening or unlocking the vehicle, and the courtesy mode is activated, the headlights may be deactivated at block 1110. This would reduce light pollution around the vehicle during the opening or unlocking process, unlike the current behavior of turning on or flashing the headlights.

At block 1112, the parking lights may be activated. Unlike headlights, the parking lights provide visibility without disturbing others. At block 1114, the horn, beeper, or chime may be deactivated when the door is opened or unlocked while the courtesy mode is active. This prevents disturbing others in such situations. The process then concludes at block 1122.

If the user intends to close or lock the vehicle at decision block 1108, the headlights may remain off or be deactivated at block 1116, reducing light pollution. At block 1118, the parking lights may remain on for a predetermined time, allowing the user to locate their vehicle at night while walking away. At block 1120, the courtesy mode may deactivate the horn, beeper, or chime when closing or locking the vehicle. The process then concludes at block 1122.

Figure 12:
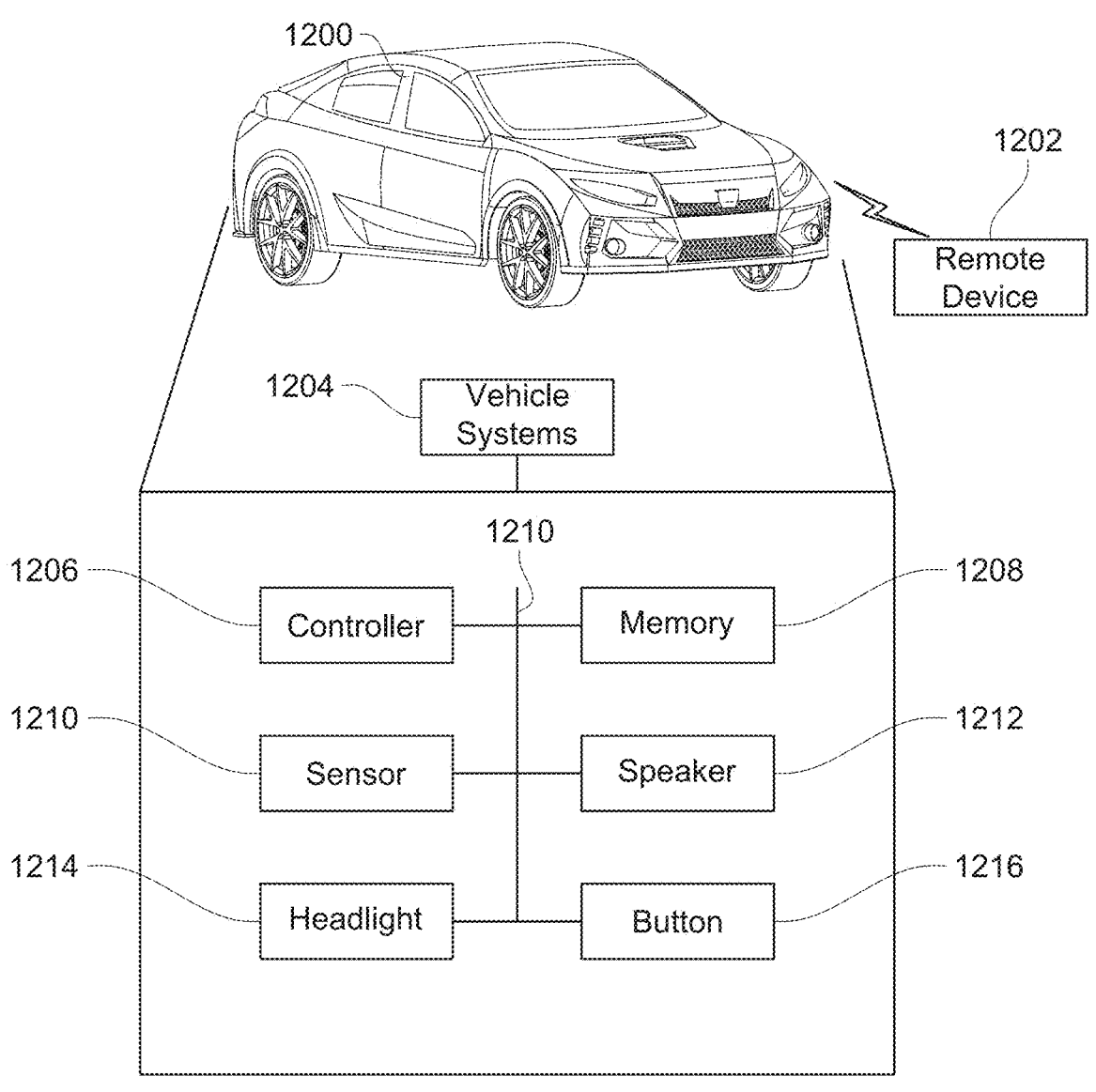
FIG. 12 illustrates a schematic view of an example operating environment of a vehicle which adjusts vehicle functions in accordance with one aspect of the disclosure.

FIG. 12 presents a schematic diagram of an example operating environment for a vehicle 1200, which adjusts vehicle functions as described in one aspect of the disclosure. The vehicle 1200 communicates with a remote device 1202, which exchanges data and commands with vehicle systems 1204 within the vehicle 1200. The remote device 1202 may be a smartphone, phone, personal device, laptop, computing device, key fob, digital key, or similar device. The components of the courtesy mode, along with other systems, hardware architectures, and software architectures discussed here, may be combined, omitted, or rearranged for various aspects of the disclosure. However, the example aspects and configurations focus on the vehicle 1200, its systems 1204, and its interactions with the remote device 1202, including corresponding system components and related methods.

The vehicle systems 1204 may include a controller 1206 for managing various vehicle functions. The controller 1206 may be an electronic control unit (ECU) that operates multiple vehicle systems 1204. For instance, the ECU might control starting and stopping the ignition, operating door locks, windows, and the audio system, managing headlights and parking lights, and/or providing a graphical user interface or programmatic interface for operators or other devices (such as processors executing the functions described herein) to control these aspects of the vehicle 1200.

The controller 1206 may also or alternatively include a processor, connected to a memory 1208 (e.g., internal processing memory), an interface circuit, and/or buses 1210 for transferring data, sending commands, and communicating with vehicle functions. The controller 1206 may interact with one or more processors and memories 1208 to execute specific actions within the vehicle 1200. These components may be connected via buses 1210 to facilitate these actions. For instance, the controller 1206 might communicate with a sensor 1210 to determine if a vehicle door is opening or closing. Based on the current situation and the courtesy mode activation, the system may adjust headlights, parking lights, and audible cues accordingly. Additionally, the controller 1206 may interact with the courtesy mode button 1216, which may be a physical button or an icon on a display screen. Activating this button 1216 may allow the controller 1206 to process data from the sensor 1210 and activate the courtesy mode.

The foregoing description is provided to enable any person skilled in the relevant art to practice the various embodiments described herein. Various modifications to these embodiments will be readily apparent to those skilled in the relevant art and generic principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A system for controlling at least one function within a vehicle comprising:

an option to remove the at least one vehicle function in a courteous mode;

a sensor determining whether a door on the vehicle has been opened or closed; and a controller removing the at least one vehicle function when the option has been selected and the vehicle door has been opened or closed, wherein the courteous mode is to remove flashing of a headlight or signaling of an audible alert.

2. The system for controlling the at least one function within the vehicle of claim 1, wherein the option is a programmable button and when the programmable button is pressed, the at least one vehicle function is capable of being removed.

3. The system for controlling the at least one function within the vehicle of claim 1, wherein the option is an icon on a user interface and when the icon is pressed, the at least one vehicle function is capable of being removed.

4. The system for controlling the at least one function within the vehicle of claim 3, wherein the icon is displayed in each screen of the user interface.

5. The system for controlling the at least one function within the vehicle of claim 1, wherein the option is provided on a smartphone or keyfob associated with the vehicle.

6. The system for controlling the at least one function within the vehicle of claim 1, wherein the at least one function is a headlight of the vehicle, wherein removing the at least one vehicle function comprises preventing flashing of the headlight.

7. The system for controlling the at least one function within the vehicle of claim 1, wherein the at least one function is a horn, beeper or chime of the vehicle, wherein removing the at least one vehicle function comprises preventing signaling of the audible alert.

8. A vehicle comprising:

a headlight;

a speaker providing an audible alert;

a sensor determining whether a door on the vehicle has been opened or closed; and a button within an instrument cluster of the vehicle when selected and the door has been opened or closed removes activation of the headlight or the audible alert, wherein the button within the instrument cluster of the vehicle is to remove flashing of a headlight or signaling of an audible alert.

9. The vehicle of claim 8, comprising at least one parking light, wherein the parking light is activated for a predetermined time after the door has been closed.

10. The vehicle of claim 8, wherein the audible alert is a horn, beeper or chime.

11. The vehicle of claim 8, wherein removing activation of the headlight or the audible alert comprises turning off the headlight after the door is closed.

12. The vehicle of claim 11, wherein the audible alert remains silent after the door is locked.

13. The vehicle of claim 8, wherein removing activation of the headlight or the audible alert comprises keeping the headlight off after the door is opened.

14. The vehicle of claim 8, wherein removing activation of the headlight or the audible alert comprises silencing the speaker after the door is opened.

15. A method for providing a courtesy mode for a vehicle comprising:

detecting selection of a button within an instrument cluster of the vehicle;

detecting when a door of the vehicle has been opened or closed;

removing activation of a headlight or audible alert when the button has been selected and the door of the vehicle has been opened or closed, wherein the courtesy mode is to remove flashing of a headlight or signaling of an audible alert.

16. The method for providing the courtesy mode for the vehicle of claim 15, wherein removing activation of the headlight or the audible alert comprises turning off the headlight after the door is closed.

17. The method for providing the courtesy mode for the vehicle of claim 16, wherein the audible alert remains silent after the door is locked.

18. The method for providing the courtesy mode for the vehicle of claim 15, wherein removing activation of the headlight or the audible alert comprises keeping the headlight off after the door is opened.

19. The method for providing the courtesy mode for the vehicle of claim 15, wherein removing activation of the headlight or the audible alert comprises silencing the speaker after the door is opened.

20. The method for providing the courtesy mode for the vehicle of claim 15, wherein the button is located on a left portion of the instrument cluster of the vehicle.

* * * * *